United States Patent [19]

Kawada et al.

[11] Patent Number: 4,614,020
[45] Date of Patent: * Sep. 30, 1986

[54] MECHANISM AND METHOD FOR AUTOMATICALLY CHANGING TOOLS

[75] Inventors: Shigeki Kawada, Hino; Yoshiki Fujioka, Higashiyamato, both of Japan

[73] Assignee: Fanuc Ltd, Minamitsuru, Japan

[*] Notice: The portion of the term of this patent subsequent to Sep. 9, 2003 has been disclaimed.

[21] Appl. No.: 498,209
[22] PCT Filed: Sep. 14, 1982
[86] PCT No.: PCT/JP82/00369
§ 371 Date: May 4, 1983
§ 102(e) Date: May 4, 1983
[87] PCT Pub. No.: WO83/01029
PCT Pub. Date: Mar. 31, 1983

[30] Foreign Application Priority Data

Sep. 14, 1981 [JP] Japan .................. 56-145329

[51] Int. Cl.⁴ ........................... B23Q 3/157
[52] U.S. Cl. ....................... 29/568; 29/26 A; 29/48.5 A; 29/426.3; 408/35; 409/211
[58] Field of Search ............. 29/26 A, 40, 42, 48.5 R, 29/48.5 A, 568, 426.3; 408/35; 409/211, 216, 217; 364/474

[56] References Cited

U.S. PATENT DOCUMENTS

| | | |
|---|---|---|
| 2,544,617 | 3/1951 | Shankweller . |
| 3,520,228 | 7/1970 | Wohlfeil ..................... 29/568 X |
| 4,223,579 | 9/1980 | Stark et al. ................. 408/35 X |
| 4,237,595 | 12/1980 | Kitamura .................... 29/26 A |

FOREIGN PATENT DOCUMENTS

| | | |
|---|---|---|
| 0010890 | 5/1980 | European Pat. Off. . |
| 0090242 | 7/1980 | Japan .......................... 29/568 |
| 57-101909 | 6/1982 | Japan . |
| 740665 | 11/1955 | United Kingdom . |

OTHER PUBLICATIONS

European Search Report, Application EP No. 79302205.4.
Supplementary European Search Report, Application EP No. 82902742.
European Patent Application No. 0088133 (claims only).

Primary Examiner—Z. R. Bilinsky
Attorney, Agent, or Firm—Staas & Halsey

[57] ABSTRACT

An automatic tool changing mechanism includes a spindle mechanism (11) having at least a spindle (11a) and a first gear (11b) rotatable in unison with the spindle; a spindle motor (12) for rotating the spindle; a tool magazine (20) having at least a storage unit (20b) for storing a plurality of tools (21), a second gear (20c) rotatable in unison with the storage unit, and a slider (20e) slidably mounted on the spindle mechanism; a Z-axis motor (19a) for moving the spindle mechanism in the direction of a Z-axis; a constraining member (23) for constraining the tool magazine against movement thereof in the direction of the Z-axis and a control circuit (102, 103) for controlling the indexing. During machining operation, the first and second gears are brought out of mesh with each other, and the spindle is rotated by the spindle motor at a prescribed speed to enable a tool mounted on the spindle to machine a workpiece. For changing tools, the first and second gears are held in mesh with each other, and the spindle motor is rotated by the control circuit to index to a desired new tool. An automatic tool changing method for the automatic tool changing mechanism is also provided.

10 Claims, 7 Drawing Figures

MECHANISM AND METHOD FOR AUTOMATICALLY CHANGING TOOLS

BACKGROUND OF THE INVENTION

1. Technical Field

The present invention relates to a mechanism and a method for automatically changing tools, and more particularly to such an automatic tool changing mechanism and method suitable for application to an apparatus in which a spindle and a tool magazine are rotated by a single spindle motor.

2. Discussion of the Prior Art

Automatic tool changing (hereinafter referred to as "ATC") functions are capable of automatically detaching a tool from a spindle and mounting a new tool on the spindle without manual intervention based on a tool change command, there being included a tool magazine storing a plurality of tools. A conventional ATC apparatus with such an ATC function has a complex mechanism for rotating the tool magazine to index to a desired new tool. An ATC apparatus as shown in U.S. Pat. No. 4,053,251, for example, converts movement of a spindle mechanism along a Z-axis into intermittent rotation of a tool magazine for changing tools. However, such a construction is complicated, and it takes a long period of time for tools to be changed as one reciprocating motion of the spindle mechanism in the direction of the Z-axis corresponds only to an angular displacement of the tool magazine for a single tool pitch.

There is another ATC apparatus in which a tool magazine is rotated by a separate motor for a tool changing operation. This apparatus however is large in size and costly to construct.

SUMMARY OF THE INVENTION

Accordingly, it is an object of the present invention to provide an automatic tool changing method and apparatus which is simple, capable of changing tools in a short period of time, and less costly.

Another object of the present invention is to provide an automatic tool changing method and apparatus with no need for a separate motor for rotating a tool magazine.

Still another object of the present invention is to provide a method of automatically changing tools in an automatic tool changing apparatus having a first gear on a spindle mechanism and a second gear on a tool magazine which is brought into mesh with the first gear for changing tools, the method being capable of bringing the first and second gears into a proper meshing relation with each other and of preventing the gears from being damaged due to incomplete gear meshing or failure of gear meshing.

A still further object of the present invention is to provide an automatic tool changing method capable of indexing tools with high precision.

There is disclosed an automatic tool changing method for an apparatus including a spindle mechanism having at least a spindle and a first gear rotatable in unison with the spindle; a spindle motor for rotating the spindle; a tool magazine having at least a storage unit for storing a plurality of tools, a second gear rotatable in unison with the storage unit, and a slider slidably mounted on the spindle mechanism; a Z-axis motor for moving the spindle mechanism in the direction of the Z-axis; a constraining member for constraining the tool magazine against movement thereof in the direction of the Z-axis and a rotation control circuit for controlling the indexing. During a machining operation, the first and second gears are brought out of mesh with each other, and the spindle is rotated by the spindle motor at a prescribed speed to enable a tool mounted on the spindle to machine a workpiece. For changing tools, the first and second gears are held in mesh with each other, and the spindle motor is rotated by the control circuit to index to a desired new tool.

According to this automatic tool changing method, there is no need for a separate motor for rotating the tool magazine, and a new tool can be indexed in a short period of time with high precision through a simple construction.

DESCRIPTION OF THE PREFERRED EMBODIMENTS

Figure 1:
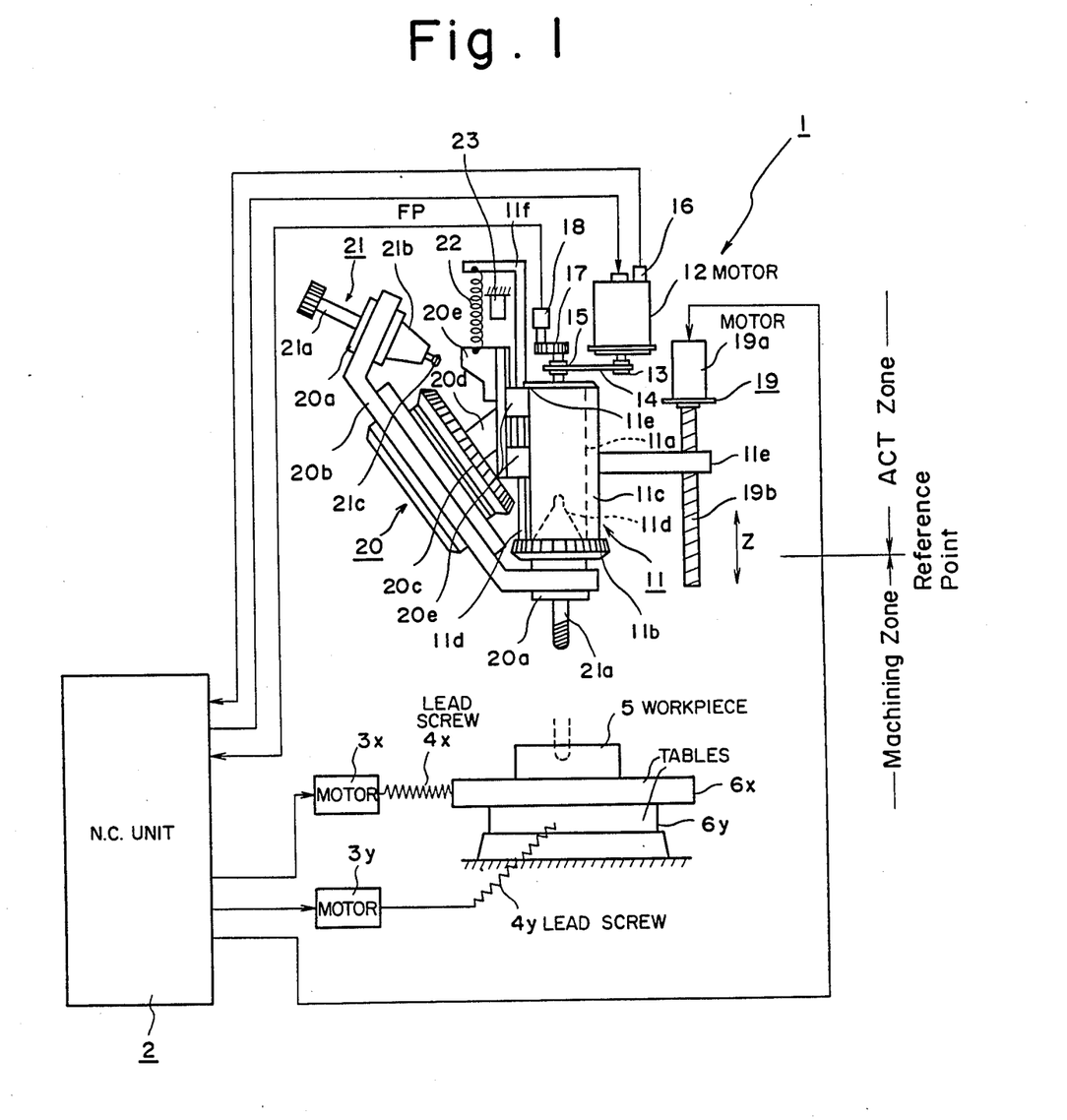
FIG. 1 is a schematic diagram of an automatic tool changing apparatus into which an automatic tool changing method according to the present invention can be incorporated.

FIG. 1 is a schematic diagram of an automatic tool changing apparatus in which an automatic tool changing method according to the present invention can be incorporated. Designated in the figure at 1 is an automatic tool changing mechanism, 2 a numerical control unit (NC unit hereinafter), 3X, 3Y feed motors for X- and Y-axes, respectively, 4X, 4Y lead screws, 5 a workpiece, and 6X, 6Y tables. The NC unit 2 has a servo control function and a fixed-position stopping function in addition to an ordinary numerical control function.

The automatic tool changing mechanism 1 has a spindle mechanism 11. The spindle mechanism 11 has a spindle 11a, a bevel gear 11b rotatable in unison with the spindle 11a, a spindle sleeve 11c, a support member 11d slidably supporting a tool magazine, described later, a nut member 11e secured to the spindle sleeve 11c and having an internally threaded portion formed in an end thereof, and an L-shaped member 11f secured to the spindle sleeve 11c. The spindle is rotated by a spindle motor 12. Rotation of the spindle motor 12 is transmitted through a pulley 13, a belt 14 and a pulley 15 to the spindle 11a. Designated at 16 is a tachogenerator for detecting the speed of rotation of the spindle motor 12, 17 a gear mechanism, 18 a pulse coder or position coder for generating a pulse FP each time the spindle 11a makes a prescribed rotation, the rotation of the spindle 11a being transmitted through the gear mechanism 17, and 19 a vertical drive mechanism for driving the spindle mechanism 11 in a vertical direction or a Z-axis direction. The vertical drive mechanism 19 is composed of a Z-axis motor 19a and a lead screw 19b. The lead screw 19b is held in mesh with the internally threaded portion in the nut member 11e and rotatable in response to rotation of the Z-axis motor 19a. When the Z-axis motor 19a is rotated, the lead screw 19b is rotated to move the spindle mechanism 11 upwardly or downwardly dependent on the direction of rotation of the lead screw 19b. A tool magazine 20 comprises a block 20b having a tool storage unit 20a storing a plurality of tools, a bevel gear 20c rotatable in unison with the block 20b, a shaft 20d, and a slider member 20e supported by the support member 11d of the spindle mechanism 11 and slidable vertically with respect to the spindle. The slider member 20e is fixed to the shaft 20d, and the bevel gear 20c and the block 20b are supported for rotation in unison on the shaft 20d. A tool member 21 has a tool 21a, a conical arbor 21b, and a distal end 21c. The tool 21a and the arbor 21b are of an integral construction. The arbor 21b has a conical side face engageable with a tapered portion (draw bar) 11d defined in an end of the spindle 11a. The distal end 21c can be fixed to the spindle by being gripped by a gripper in the spindle, (not shown). A spring 22 extends between the slider member 20e of the tool magazine 20 and the L-shaped member 11f of the spindle mechanism 11 for normally urging the slider 20e upwardly. As a result, the slider member 20e is held in engagement with a head 11e of the spindle sleeve 11c and movable with the spindle mechanism 11 until the slider member 20e abuts against a stop, described later. When the slider member 20e abuts against a stop 23 fixed to the machine while the spindle mechanism 11 and the tool magazine 20 are moving upwardly in unison, the tool magazine is stopped and only the spindle mechanism 11 moves upwardly.

A tool changing operation will be described with reference to FIG. 1. FIG. 1 shows the condition in which the spindle mechanism 11 is positioned at a reference point in the Z-axis direction. A zone below the reference point will be referred to as a machining zone, and that above the reference point as an ATC zone.

After a given machining operation on the workpiece 5 has been finished as shown by the dotted line in the machining zone, a tool change command $$T\square\square M06* \qquad (1)$$

is issued from an NC tape (not illustrated), to enable the NC unit 2 to start tool change control. Designated in (1) at T$\square\square$M is a T function command, with the tool number of a new tool being indicated by $\square\square$. M06 indicates an M function command for commanding tool changing.

Under the tool change command (1), the NC unit 2 rotates the Z-axis motor 19a to raise the spindle mechanism 11 and the tool magazine 20 together to the reference point on the Z-axis (the condition shown in FIG. 1), and at the same time rotates the spindle motor 2 to stop the spindle 11a at a fixed position (spindle orientation). The spindle orientation and the returning movement to the reference point on the Z-axis may be carried out separately, one prior to the other in any order. The spindle orientation thus effected causes the bevel gear 11b of the spindle mechanism 11 and the bevel gear 20c of the tool magazine 20 to properly mesh with each other in a later step. More specifically, the position in which the spindle 11a is stopped by spindle orientation is determined in advance as a position for meshing engagement with the bevel gear 20c.

Thereafter, the Z-axis motor 19a is further rotated to cause the spindle mechanism 11 and the tool magazine 20 in unison to enter the ATC zone and move upwardly in the ATC zone. As the spindle mechanism 11 ascends in the ATC zone, a non-illustrated cam is actuated en route to enable the gripper, not shown, in the spindle 11 to release the distal end 21c of the arbor 21 (unclamping). The upward movement of the spindle mechanism 11 and the tool magazine 20 then results in abutment of the slider member 20e of the tool magazine 20 against the stop 23. As a consequence, the tool magazine 20 is stopped in its upward movement while the spindle mechanism 11 is allowed to ascend.

Continued upward movement of only the spindle mechanism 11 causes the arbor to disengage from the tapered portion 11d in the spindle 11a. Substantially at the same time, the bevel gear 11b of the spindle mechanism 11 is brought into meshing engagement with the bevel gear 20c of the tool magazine 20, and the rotation of the Z-axis motor 19a is arrested.

With the bevel gears 11b, 20c in mutually meshing engagement, the spindle motor 12 is rotated to rotate the tool magazine 20 to position a new tool immediately below the spindle 11 (indexing of a new tool).

After the new tool has been positioned directly below the spindle, the Z-axis motor 19a is reversed to lower the spindle mechanism 11 thereby bringing the tapered portion 11d in the spindle 11 into intimate contact with the arbor 21b of the new tool. The tool magazine 20 also starts descending with the spindle mechanism 11. At a prescribed position, the distal end 21c of the arbor 21b is gripped by the gripper in the spindle 11 (clamping). On return to the reference point on the Z-axis due to the continued downward movement, the rotation of the Z-axis motor 19a is stopped to complete the automatic tool changing operation.

After the automatic tool changing operation, a Z-axis positioning command is issued from the NC tape, whereupon the spindle mechanism 11 and the tool magazine 20 move together downwardly in the machining zone for machining the workpiece again.

Figure 2:
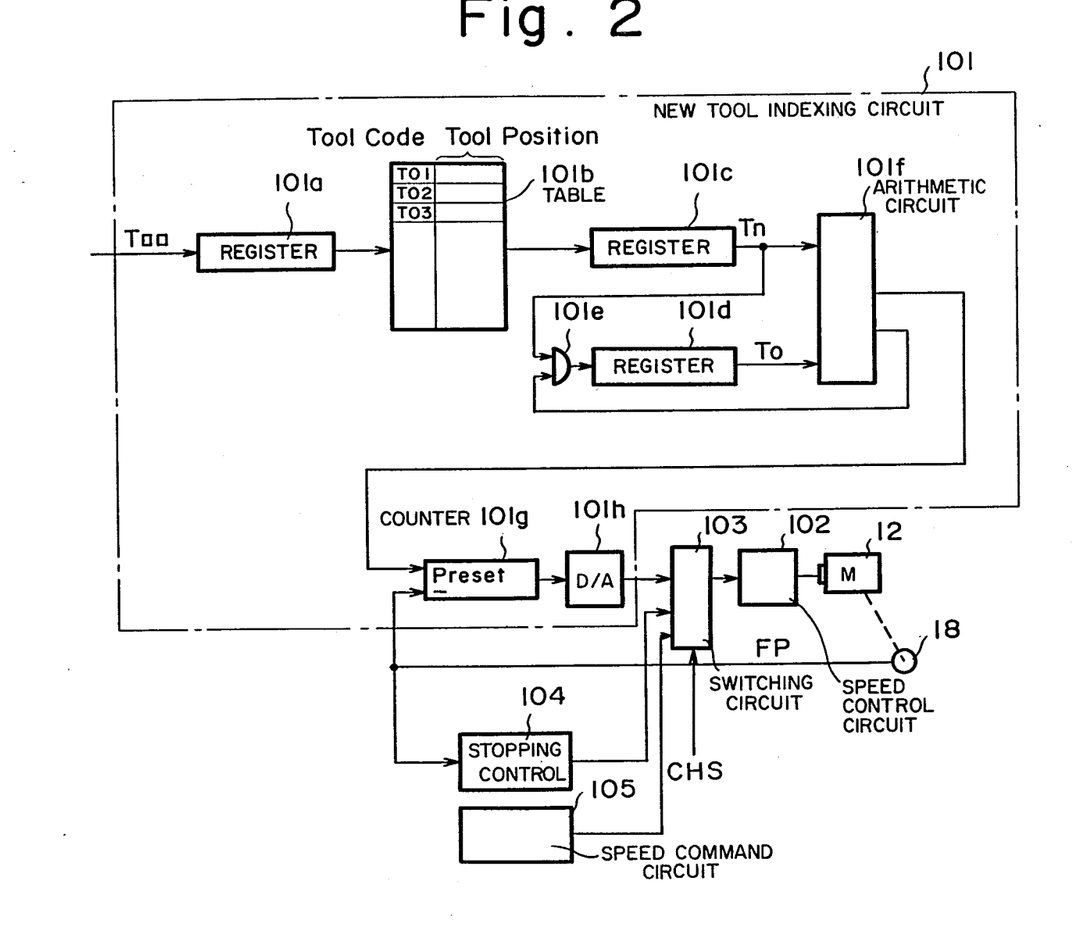
FIG. 2 is a block diagram of a new-tool indexing circuit.

FIG. 2 is a block diagram of a new-tool indexing circuit for indexing a new tool. Designated in the figure at 101 is a new-tool indexing circuit, 102 a speed control circuit, 103 a switching circuit, 104 a fixed-position stopping control circuit, and 105 a speed command circuit. The switching circuit 103 selects either the speed command circuit 105 when the spindle is to be rotated at a prescribed speed, or the fixed-position stopping control circuit 104 at the time of spindle orientation, or the new-tool indexing circuit 101 when a new tool is to be indexed. The spindle motor is denoted by 12 and the pulse coder by 18. The new-tool indexing circuit 101 has a tool code register 101a for storing a tool code T$\square\square$ when a tool change command is given, and a table 101b storing tool codes and corresponding tool positions. Each tool position is defined as an angle of rotation from a reference position on the tool magazine to a designated tool. The tool position can be expressed, for example, by the number of pulses generated by the pulse coder 18 before a designated tool is positioned immediately below the spindle by rotation thereof after the reference position on the tool magazine has been positioned directly below the spindle. Designated at 101c is a new-tool position register for storing the tool position Tn of a new tool designated by a tool change command, 101d a current-tool position register for storing the tool position To of a current tool now selected, and 101f an arithmetic circuit for determining and issuing the difference between the new-tool position Tn and the current-tool position To and for storing the new-tool position Tn as the current-tool position into the current-tool position register 101d by opening a gate circuit 101e. The determined difference may be corrected or adjusted for rotating the tool magazine at a higher speed. Also indicated at 101g is a reversible counter for presetting the difference therein and counting pulses Fp, reversibly dependent on the direction of rotation pulses, generated by the pulse coder 18 each time the spindle motor 12 is rotated through a predetermined angular interval, and 101h a D/A converter for coverting the count in the reversible counter into an analog quantity.

When the new-tool indexing circuit 101 is supplied with a tool change command, it converts the code of a newly designated tool into a tool position and stores the tool position into the new-tool position register 101c, presets the difference between the new-tool position Tn and the current-tool position To into the reversible counter 101g, and rotates the spindle motor 12 and hence the tool magazine so that the count in the reversible counter 101g will fall to zero, thereby positioning the newly selected tool immediately below the spindle.

Figure 3:
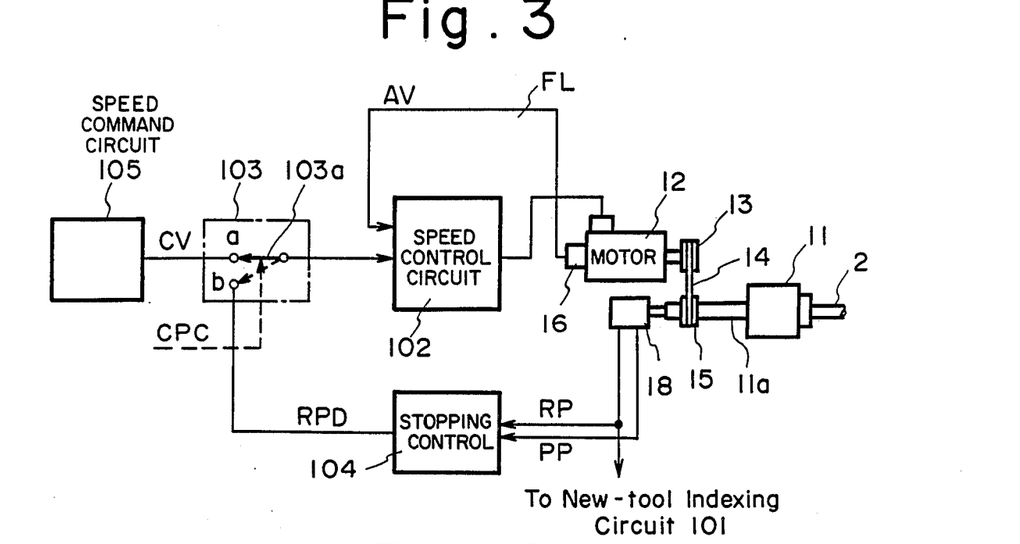
FIG. 3 is a block diagram of a servo system for controlling spindle rotation, excluding the tool indexing circuit.
Figure 4:
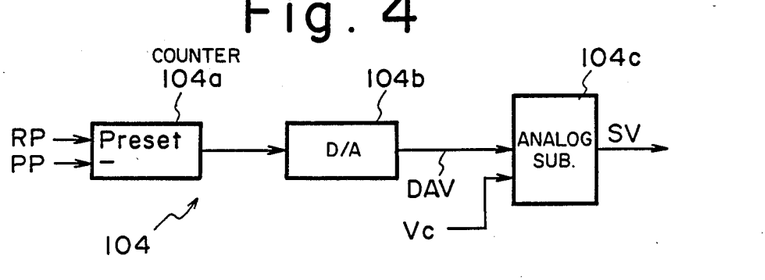
FIG. 4 is a block diagram of a control circuit for stopping a spindle in a fixed position, the control circuit serving to realize spindle orientation.
Figure 5:
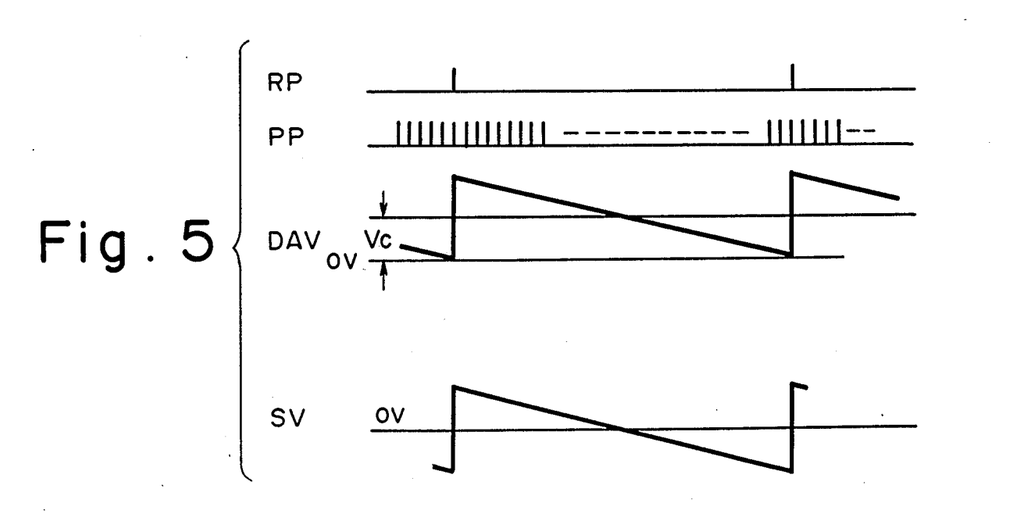
FIG. 5 is a diagram showing the waveforms of various signals in FIG. 4.

FIG. 3 is a block diagram of a servo system for controlling spindle rotation, excluding the tool indexing circuit 101, FIG. 4 is a block diagram of the fixed-position stopping control circuit 104g for achieving spindle orientation, and FIG. 5 is a diagram showing the waveforms of various signals in the circuit. Identical parts in these figures are denoted by the same reference characters as in FIGS. 1 and 2. A position coder is employed as the pulse coder.

When the spindle motor 12 is to be stopped after a machining operation has ended, a command speed CV issued from the speed command circuit 105 is set to zero, for example, to decelerate the rotation of the spindle motor 12 by electrically braking the latter. Immediately before the spindle motor 12 is stopped, that is, when the speed of rotation thereof is considerably lowered, a fixed-position stopping command CPC is given to a change-over switch 103a of the switching circuit 103 to move a movable contact of the change-over switch 103a to a contact b.

The fixed-position stopping control circuit 104 generates a position deviation signal RPD (analog voltage) dependent on the difference between a commanded stop position (which is determined beforehand) and a current position. Operation of the fixed-position stopping control circuit 104 will be described with reference to FIGS. 4 and 5 for a single commanded stop position, on the assumption that the position coder 18 produces one-revolution signal RP each time the spindle 11a makes one revolution and a total number N of pulses PP each time the spindle 11a makes one revolution, one pulse or angle pulse PP being generated when the spindle rotates through a prescribed angular interval. Designated in FIG. 4 at 104a is a counter for setting a numerical value N therein in response to the one-revolution signal RP issued from the position coder 18 and for reducing the count therein each time a pulse PP is generated, 104b a D/A converter for converting the content of the counter 104 into an analog quantity (D/A conversion), and 104c an analog subtracter for issuing a voltage SV (position deviation voltage RPD) indicative of the difference between an output voltage DAV from the D/A converter and a constant reference voltage Vc. Where the voltage Vc is selected to be ½ of the peak value of the output voltage DAV from the D/A converter, the subtracter produces a sawtooth difference voltage SV which crosses the zero level 180° after each one-revolution signal RP is generated, as shown in FIG. 5. By shifting the commanded stop position for the spindle exactly 180° after the one-revolution signal RP is generated, a prescribed portion of the spindle can be determined as reaching the commanded stop position when the difference voltage SV crosses the zero level.

When the change-over switch 103a of the switching circuit 103 is shifted to the contact b, the speed control circuit 102 issues a voltage indicative of the difference between the position deviation RPD and an actual speed AV, and effects servo positional control so that the position deviation RPD will fall to zero. More specifically, the speed control circuit 102, the spindle motor 12, the spindle 11a, the position coder 18, the fixed-position stopping control circuit 104, and the change-over switch 103a jointly constitute a positional control feedback loop for positioning the prescribed spindle portion in a commanded stop position.

Figure 6:
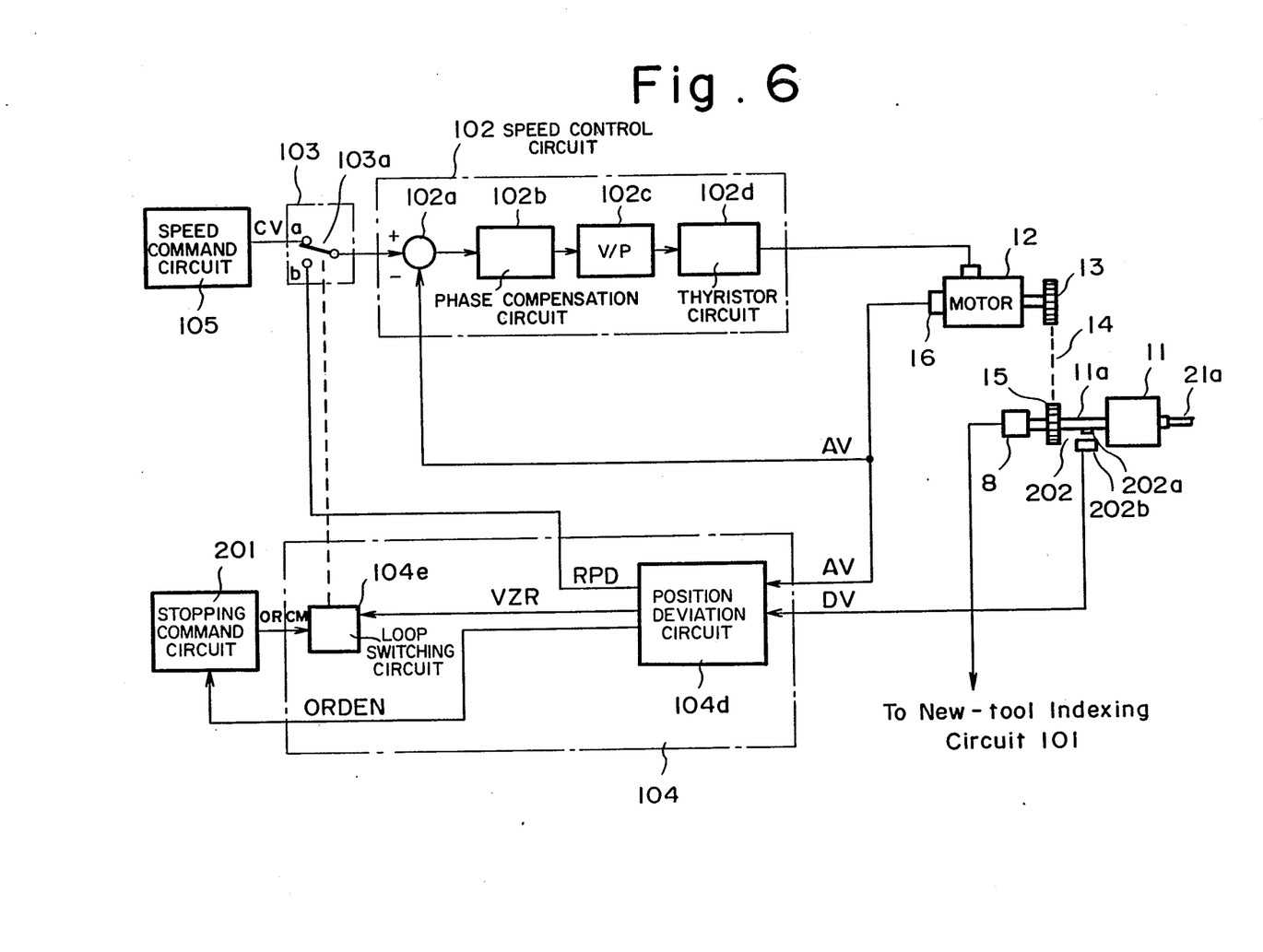
FIG. 6 is a block diagram of a control circuit for stopping a spindle in a fixed position according to another embodiment, the control circuit serving to realize spindle orientation.
Figure 7:
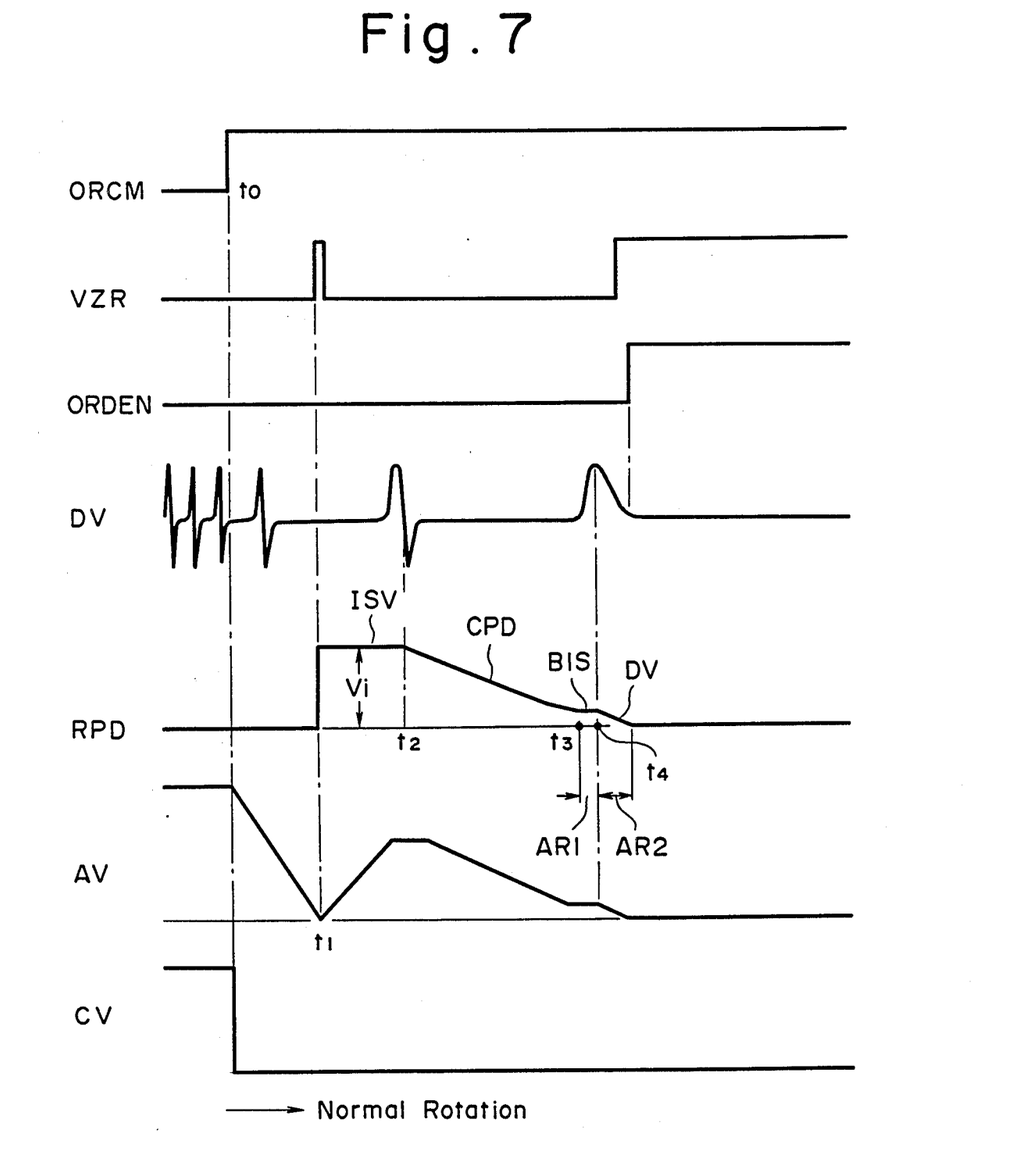
FIG. 7 is a diagram of waveforms showing the operation of the control circuit.

FIG. 6 is a block diagram of a servo system for controlling spindle rotation with a magnetic sensor attached to the spindle for fixed-position stopping control, and FIG. 7 is a diagram of waveforms in the arrangement of FIG. 6. Identical parts in these figures are denoted by the same reference characters as in FIGS. 1 and 2. Designated at 102 is a speed control circuit, 103 a switching circuit having a change-over switch 103a, 104 a fixed-position stopping circuit, 201 a fixed-position stopping command circuit for issuing a fixed-position stopping command (orientation command), and 202 a magnetic sensor. The speed control circuit 102 has an adder 102a, a phase compensation circuit 102b, a voltage-to-phase converter 102c, and a thyristor 102d. The adder 102a issues a voltage (speed deviation) indicative of the difference between a commanded speed CV and an actual speed AV for speed control, and issues a voltage indicative of a position deviation RPD and the actual speed AV for positional control. The phase compensation circuit 102b serves to advance or delay the phase of an output voltage from the adder to compensate the phase thereof. The phase-to-voltage converter 102c controls the ignition of thyristors in the thyristor circuit 102d with an ignition phase dependent on the output voltage from the phase compensation circuit 102b. With the thyristors thus controlled in their ignition phase, the thyristor circuit 102d varies the voltage applied to the spindle motor 12 to control the speed of rotation of the spindle motor 12. The magnetic sensor 202 is composed of a magnetic field generator 202a and a sensing circuit 202b. The magnetic sensor 202 generates a fine positional deviation signal DV. The fixed-position stopping control circuit 104 comprises a position deviation signal generating circuit 104d for generating a position deviation signal RPD having a voltage dependent on a position deviation and an orientation completion signal ORDEM, and a loop switching circuit 104e for shifting the switch 103a based on an orientation command from the fixed-position stopping command circuit 201. Operation of the control circuit for stopping the spindle in a fixed position shown in FIG. 6 will be described with reference to the waveform diagram of FIG. 7 for a situation in which the spindle is to be stopped in the fixed position after rotating normally.

During normal rotation (while machining a workpiece), the switch 103a is shifted to a contact a to form a speed control loop. More specifically, the adder 102a is supplied with a speed command CV from the speed command circuit 105 and an actual speed AV from the tachogenerator 16, and issues a speed deviation voltage. The ignition phase of the thyristors of the thyristor circuit 102d is controlled by the voltage-to-phase converter 102c dependent on the speed deviation voltage to increase or reduce the voltage impressed on the spindle motor 12. As a result, the actual speed AV of rotation of the spindle motor 12 is increased or reduced so as to conform to the commanded speed CV. Thereafter, the speed of rotation of the spindle motor is controlled so that the speed deviation will be eliminated. Thus, the spindle during its rotation is controlled to rotate substantially at the commanded speed.

When a machining operation is finished under this condition, the fixed-position command circuit 201 issues an orientation command ORCM to the loop switching circuit 104b at a time $t_0$, and at the same time the speed command CV falls to zero. The actual speed AV is then reduced until it becomes zero (or falls to a predetermined constant speed) at a time $t_1$.

Upon the actual speed AV falling to zero, a speed zero signal VZR is generated in the position deviation signal generating circuit 104d, and enables the loop switching circuit 104e to shift the switch 103b to the contact b, whereupon the system changes from the speed control into the positional control. The speed zero signal VZR also enables the position deviation signal generating circuit 104d to issue an initial setting voltage ISV (=Vi) at first. This causes the spindle to start rotating again to increase the actual speed signal AV into conformity with the voltage Vi. When the magnetic field generator 202a continues to rotate until it arrives at a first fixed position (at a time $t_2$), the position deviation signal generating circuit 104d issues a coarse position deviation signal CPD (see FIG. 7). As the magnetic field generator 202a approaches a first proximity zone $AR_2$ (at a time $t_3$) due to continued rotation of the spindle, the position deviation signal generator 104d produces a bias signal BIS. When the magnetic field generator reaches a second proximity zone $AR_2$ (at a time $t_4$), the position deviation signal generator produces a fine position deviation signal DV. When the fine position deviation signal DV falls to zero, the spindle stops rotating, and the control for stopping the spindle in the fixed position is brought to an end. For details of the position deviation signal generating circuit 104d, reference should be made to Japanese Patent Application No. 55-178553.

In the foregoing description, pulses generated by the pulse coder (or position coder) are employed for a tool changing operation and control for stopping the spindle in the fixed position (FIGS. 2 and 3), and pulses generated by the pulse coder are used for the tool changing operation and a signal produced by the magnetic sensor is used for fixed-position stopping control (FIGS. 6 and 7). However, an arrangement can be made to effect the tool changing operation and the fixed-position stopping control only with the magnetic sensor. With the arrangement of the present invention, as described above, the spindle motor can be utilized for rotating not only the spindle but the tool magazine. Since a newly selected tool can be indexed continuously, but not intermittently as is conventional, the time required for changing tools can be shortened. The bevel gear of the tool magazine and the bevel gear of the spindle mechanism are brought into or out of mesh with each other dependent on whether the apparatus is in a mode of tool changing operation or machining operation, for thereby effecting the automatic tool changing operation or the machining operation. The spindle is stopped in a fixed position by a spindle orientation before the bevel gears are brought in mesh with each other. This allows the bevel gears to properly mesh with each other, with no danger that the gears will be damaged on their meshing engagement. Further according to the present invention, the tool magazine is rotated in response to rotation of the spindle for indexing a newly selected tool. This arrangement enables a combined pulse coder to perform correct tool indexing.

We claim:

1. An automatic tool changing apparatus, comprising:
a spindle mechanism having at least a spindle and a first gear attached to and rotatable with the spindle;
a spindle motor for rotating the spindle;
a tool magazine having at least a storage unit for storing a plurality of tools, a second gear attached to and rotatable with the storage unit and meshable with the first gear;
a slider slidably mounted on the spindle mechanism;
a Z-axis motor for moving the spindle mechanism in the direction of a Z-axis while the spindle mechanism travels on said slider;
a constraining member for constraining the tool magazine against movement thereof in the direction of the Z-axis, during a machining operation the first and second gears are brought out of mesh with each other and the spindle is rotated by the spindle motor at a prescribed speed to enable a tool mounted on the spindle to machine a workpiece, and during a tool changing operation the first and second gears are held in mesh with each other and the spindle motor is rotated to position the tool magazine to index to a desired new tool; and
spindle fixed position stopping control means, operatively connected to said spindle motor, for stopping the spindle at a fixed position after the machining operation and before the tool changing operation.

2. An automatic tool changing method in an automatic tool changing mechanism comprising a spindle mechanism having at least a spindle and a first gear attached to and rotatable with the spindle; a spindle motor for rotating the spindle; a tool magazine having at least a storage unit for storing a plurality of tools, and a second gear attached to and rotatable with the storage unit and meshable with the first gear; a slider slidably mounted on the spindle mechanism; a Z-axis motor for moving the spindle mechanism in the direction of a Z-axis while the spindle mechanism travels on the slider; and a constraining member for constraining the tool magazine against movement thereof in the direction of the Z-axis, so that a prescribed tool can be mounted on the spindle based on a tool change command, said automatic tool changing method comprising the steps of:

(a) stopping the spindle in a fixed position based on the tool change command and rotating the Z-axis motor to cause the tool magazine and the spindle mechanism to move together from a machining zone to a reference point;

(b) moving the tool magazine and the spindle mechanism in unison until the movement of the tool magazine is constrained by said constraining member;

(c) moving only the spindle mechanism after the tool magazine has been constrained by the constraining member to release the tool from the spindle and bringing the first and second gears into mesh with each other;

(d) rotating the spindle motor to rotate the tool mazazine for indexing to a commanded new tool;

(e) moving the spindle mechanism in the Z-axis direction after the tool has been indexed to mount the new tool on the spindle; and (f) moving the tool magazine and the spindle mechanism in unison to the reference point after the new tool has been mounted.

3. An automatic tool changing method according to claim 2, wherein said automatic tool includes a pulse coder coupled to said spindle, and wherein said step of rotating the spindle motor for indexing to the commanded new tool comprises the steps of:

(di) generating a pulse each time said spindle rotates through a prescribed angular interval;

(dii) specifying the position of each tool with the number of pulses away from a reference position;

(diii) determining the position of the commanded new tool based on a code of a designated tool; and (div) rotating the spindle motor using a new-tool position and a previous-tool position to index to the commanded new tool.

4. An automatic tool changing method according to claim 2, wherein said automatic tool includes a pulse coder mounted on said spindle, and wherein said step of stopping said spindle in the fixed position comprises:

(ai) generating a pulse PP each time the spindle rotates through a prescribed angular interval and a one-revolution signal RP each time the spindle makes one-revolution; and (aii) stopping the spindle when a predetermined number of pulses PP are produced after the one-revolution signal RP has been generated.

5. An automatic tool changing method according to claim 2, wherein said automatic tool includes a magnetic sensor, and wherein said step of stopping said spindle in the fixed position comprises:

(ai) generating an S-shaped position deviation signal before and after a commanded stop position; and (aii) stopping the spindle when the position deviation signal from the magnetic sensor falls to zero.

6. An automatic tool changing mechanism according to claim 1, further comprising:

actual speed generating means, coupled to said spindle motor, for producing an actual speed of said spindle motor;

position generating means, coupled to said spindle, for producing a position of the spindle;

a tool indexing position control circuit operatively connected to said position generating means;

a stopping control circuit operatively connected to said actual speed generating means and said position generating means;

a speed command circuit;

a switching device, operatively connected to said tool indexing position control circuit, said stopping control circuit and said speed command circuit, for switching between the circuits; and a speed control device operatively connected to said switching device and said spindle motor.

7. An automatic tool changing mechanism according to claim 7, wherein said tool position indexing circuit comprises;

a new tool designation register;

tool position table storage means, operatively connected to said new to designation register, for outputting a new tool position; and position means, operatively connected to said tool position table storage means and said switching device, for outputting position pulses dependent on the difference between the new tool position and a current tool position.

8. An apparatus as recited in claim 1, further comprising:

a spindle position coder, coupled to said spindle mechanism, for producing a spindle position; and a speed control circuit, operatively connected to said spindle motor and said spindle fixed position stopping control means; and wherein said spindle fixed position stopping control means produces to the speed control circuit a position deviation signal indicating the deviation of the spindle position from the fixed position.

9. An apparatus as recited in claim 8, wherein said spindle position coder produces a revolution pulse and angle pulses, and said fixed position stopping control means comprises:

a presetable counter, operatively connected to said spindle position coder, having a count set therein by the revolution pulse, counting down in dependence upon the angle pulses and producing a position count;

a digital-to-analog converter, operatively connected to said presetable counter, for converting the position count into an output voltage; and an analog subtractor, operatively connected to said digital-to-analog converter and said speed control circuit, for subtracting the output voltage from a reference voltage and producing the position deviation signal.

10. An apparatus as recited in claim 9, wherein the reference voltage equal to the volume produced by said digital-to-analog converter when said presetable counter counts one-half the number of angle pulses produced by one revolution of the spindle.

* * * * *

UNITED STATES PATENT AND TRADEMARK OFFICE
CERTIFICATE OF CORRECTION

PATENT NO. : 4,614,020

DATED : September 30, 1986

INVENTOR(S) : SHIGEKI KAWADA

It is certified that error appears in the above-identified patent and that said Letters Patent is hereby corrected as shown below:

Col. 10, line 14, "7" should be --6--.

Signed and Sealed this

Twenty-fourth Day of February, 1987

Attest:

DONALD J. QUIGG

*Attesting Officer*   *Commissioner of Patents and Trademarks*